US008959101B2

(12) United States Patent
Grossman (10) Patent No.: US 8,959,101 B2
(45) Date of Patent: Feb. 17, 2015

(54) AUTOMATED USER-FRIENDLY CLICK-AND-SEARCH SYSTEM AND METHOD FOR HELPING BUSINESS AND INDUSTRIES IN FOREIGN COUNTRIES USING PREFERRED TAXONOMIES FOR FORMULATING QUERIES TO SEARCH ON COMPUTER NETWORK AND FOR FINDING RELEVANT INDUSTRIAL INFORMATION ABOUT PRODUCTS AND SERVICES IN EACH INDUSTRIAL GROUP, AND MEDIA FOR PROVIDING QUALIFIED INDUSTRIAL SALES LEADS

(71) Applicant: Pierre Grossman, Sao Paulo (BR)

(72) Inventor: Pierre Grossman, Sao Paulo (BR)

( * ) Notice: Subject to any disclaimer, the term of this patent is extended or adjusted under 35 U.S.C. 154(b) by 79 days.

(21) Appl. No.: 13/671,611

(22) Filed: Nov. 8, 2012

(65) Prior Publication Data

US 2013/0066846 A1      Mar. 14, 2013

Related U.S. Application Data

(63) Continuation of application No. 10/959,334, filed on Oct. 6, 2004, now Pat. No. 8,332,421.

(51) Int. Cl.
*G06F 17/30* (2006.01)
*G06F 7/00* (2006.01)

(52) U.S. Cl.
CPC .................. *G06F 17/30864* (2013.01)
USPC .......................................... 707/759; 707/769

(58) Field of Classification Search
CPC .................. G06F 17/30427; G06F 17/30023; G06F 17/3066
USPC .......................................... 707/758, 760, 761
See application file for complete search history.

(56) References Cited

U.S. PATENT DOCUMENTS

| 5,787,418 | A | | 7/1998 | Hibbetts et al. | |
|---|---|---|---|---|---|
| 6,006,221 | A | * | 12/1999 | Liddy et al. | 1/1 |
| 6,064,951 | A | * | 5/2000 | Park et al. | 704/8 |
| 6,571,241 | B1 | * | 5/2003 | Nosohara | 1/1 |
| 6,604,101 | B1 | | 8/2003 | Chan et al. | |
| 6,763,349 | B1 | | 7/2004 | Sacco | |
| 7,146,358 | B1 | | 12/2006 | Gravano et al. | |

(Continued)

OTHER PUBLICATIONS

Gey et al, Entry Vocabulary—a Technology to Enhance Digital Search, Association of Computational Linguistics, 2011 pp. 1-5.*

(Continued)

*Primary Examiner* — Pavan Mamillapalli
(74) *Attorney, Agent, or Firm* — Morgan Lewis & Bockius LLP (57) ABSTRACT

The invention, in general, comprises systems and methods for finding information relevant to a user on the World Wide Web. In various embodiments, the invention comprises using one or more of the following: ready-made English-language queries; an ISO Technical Standards Specification Terminology database; an economic activities database based on North American Industry Classification (NAICS); a language interface configured to enable a user to use his native language for constructing an initial query sentence based on subject structure and to obtain a corresponding English language query; an automated method of extracting site (URL) information on products, services and economic activities on the Web; and providing records showing search histories (with URLs), user names, and time data for marketing or research purposes.

34 Claims, 8 Drawing Sheets

(56) References Cited

U.S. PATENT DOCUMENTS

| | | | |
|---|---|---|---|
| 7,792,884 B2* | 9/2010 | Schlachta-Fairchild et al. | 707/705 |
| 2002/0007279 A1 | 1/2002 | Matsuda et al. | |
| 2002/0111937 A1* | 8/2002 | Wetherbee et al. | 707/1 |
| 2003/0033295 A1* | 2/2003 | Adler et al. | 707/3 |
| 2004/0230461 A1 | 11/2004 | Talib et al. | |
| 2004/0243593 A1 | 12/2004 | Stolte et al. | |
| 2006/0173920 A1* | 8/2006 | Adler et al. | 707/104.1 |
| 2006/0271561 A1* | 11/2006 | Schlachta-Fairchild et al. | 707/10 |

OTHER PUBLICATIONS

Pouliquen et al, Geographic Information Recognition and Visualization in Texts Written in Various Languages, ACM Press, Mar. 14, 2004, pp. 1051-1058.*

Brodeur et al, Modeling Geospatial Application Databases using UML-based Reposiories Aligned with International Standards in Geomatics, ACM Press, 2000, pp. 39-46.*

Kalnis et al, Proxy-Server Architecture for OLAP, May 21-24, 2001, ACM SIGMOD 2001, pp. 367-378.*

Hong et al, WebQuilt: A Proxy-based Approach to Remote Web Usability Testing, ACM Transactions on Information Systems, Jul. 2001, pp. 263-285.*

Ogden et al, Improving Cross-Language Text Retrieval with Human Interactions, Jan. 4-7, 2000, Hawaii International Conference with Human Interactions, pp. 1-9.*

Gey et al., Entry Vocabulary—a Technology to Enhance Digital Search, Association of Computational Linguistics, 2001 pp. 1-5.

Pouliquen et al., Geographic Information Recognition and Visualization in Texts Written in Various Languages, ACM Press, Mar. 14, 2004, pp. 1051-1058.

Brodeur et al., Modeling Geospatial Application Databases using UML-based Repositories Aligned with International Standards in Geomatics, ACM Press, 2000, pp. 39-46.

Hong et al., WebQuilt: A Proxy-based Approach to Remote Web Usability Testing, ACM Transactions on Information Systems, Jul. 2001, pp. 263-285.

Ogden etal., Improving Cross-Language Text Retrieval with Human Interactions, Jan. 4-7, 2000, Hawaii International Conference with Human Interactions, pp. 1-9.

Catarcia et al., An Ontology Based Visual Tool for Query Formulation Support; 2003; OTM Workshots 2003, LNCS 2889, pp. 32-33.

* cited by examiner

AUTOMATED USER-FRIENDLY CLICK-AND-SEARCH SYSTEM AND METHOD FOR HELPING BUSINESS AND INDUSTRIES IN FOREIGN COUNTRIES USING PREFERRED TAXONOMIES FOR FORMULATING QUERIES TO SEARCH ON COMPUTER NETWORK AND FOR FINDING RELEVANT INDUSTRIAL INFORMATION ABOUT PRODUCTS AND SERVICES IN EACH INDUSTRIAL GROUP, AND MEDIA FOR PROVIDING QUALIFIED INDUSTRIAL SALES LEADS

CROSS-REFERENCE TO RELATED APPLICATIONS

This application is a Continuation of U.S. patent application Ser. No. 10/959,334 filed on Oct. 6, 2004 which is incorporated herein by reference in its entirety.

BACKGROUND

The present invention relates generally to systems and methods for a friendly interface (any language) that use ready-made English language queries for retrieving relevant information on a computer network such as the Internet.

Internet dynamism and the latest cutting-edge innovations have created a stunningly important archive of potentially relevant web sites that is not easily searchable.

Now more than ever, industrial users rely on the internet for information about products, services and economic activities. With over 9 million distinct websites and billions of individual webpages, finding high-quality information about products, services and economic activities is increasingly challenging and difficult.

Providers of information and services know that their websites form a key component of their business and that, in a crowded information marketplace, searchers from the industry must be able to find the providers' websites using search engines.

The way most people use an Internet search engine is to try a couple of keywords and see what turns up. Since most people are not familiar with well over 450,000 standard terms about products, services and economic activities, a naive keyword search is not likely to yield decent results. To achieve satisfactory results, a searcher must spell the precise technical key-word correctly (in English), must know Boolean query language, and must have search refinement expertise.

SUMMARY

It is therefore an object of the present invention to provide systems and methods for overcoming the above-mentioned difficulties In a first aspect, the invention is operable to build ready-made query sentences with click-and-search, preferably with a multi-language communication interface optimized for use by industry. The query sentences are constructed using an ISO Technical Standards Specification Terminology database that stores technical terminologies of products and services. Alternatively, a user can select an economic activities specifications database that uses activities standardization from the NAICS structure. A user may also customize his query by using a list of commonly-used technical terms, a list of international commerce terms and/or a list of countries for cross referencing, and may refine the query by removing undesirable words.

Once his sentence is constructed, the search engines can retrieve the relevant ready-made query from the database. The user is ready to browse the World Wide Web using Web search engines and can retrieve the relevant links.

A second aspect of the invention comprises a method that shows all web sites visited by users, thus providing qualified industrial sales leads. A user report preferably comprises uniform resource locators (URLs), a user profile, and log dates of web addresses searched.

A third aspect of the invention comprises a method that uses several different languages to communicate with users. A language interface is configured to help users select a preferred language so that a non-English speaking user can build a ready-made query in his native language. The non-English query is then translated into an English language query. Various computer programs are available for such translations.

The invention, in general, comprises systems and methods for finding information relevant to a user on the World Wide Web. In various embodiments, the invention comprises using one or more of the following: ready-made English-language queries; an ISO Technical Standards Specification Terminology database; an economic activities database based on North American Industry Classification (NAICS); a language interface configured to enable a user to use his native language for constructing an initial query sentence based on subject structure and to obtain a corresponding English language query; an automated method of extracting site (URL) information on products, services and economic activities on the Web; and providing records showing search histories (with URLs), user names, and time data for marketing or research purposes.

Preferred embodiments comprise systems for searching a computer network, comprising: one or more databases containing standardized terms; user interface software in communication with said one or more databases; and a server in communication with said user interface software, said one or more databases, and a computer network; wherein said user interface software is operable to enable a user to construct queries comprising terms from said one or more databases, said queries to be used to search said computer network. In various aspects, the computer network is the Internet; one or more databases comprise a products and services database; one or more databases comprise an economic activities database; one or more databases comprise a technical terms database; one or more databases comprise a commerce terms database; and one or more databases comprise a geographical terms database.

The geographical terms database may comprise a country list database. The products and services database may comprise ISO technical standards specification terminology, and the ISO technical standards specification may comprise ICS (International Code Standard) terminology. The economic activities database may comprise NAICS data, and the NAICS data may comprise information relevant to a search for products or services or to a search for economic activities. The economic activities database may also comprise NAPCS or analogous data.

In various embodiments, the system may further comprise multi-language interface software in communication with user interface software. The multi-language interface software preferably is operable to enable a user to construct queries in the user's native language, using ready-made sentences. The multi-language interface software preferably is operable to enable a user to construct queries in English by interacting with the user in the user's native language.

In one embodiment, the system comprises user reporting software in communication with the server and operable to record data comprising one or more of: queries, search results of queries, and user identities. Queries in the user's native language may be constructed via the user selecting technical terms using a hierarchical structure (or more generally, any sort of taxonomic structure).

An embodiment may comprise software for translating said queries in said user's native language into English language queries. Software for this purpose is widely available for purchase; those skilled in the art may construct their own translation software using well-known principles.

An embodiment also may provide software for editing queries (especially English language queries). Such editing may comprise selecting and adding terms from lists of business, technical, or geographic terms.

In other embodiments, the present invention may comprise methods for enabling a user to search a computer network. One preferred method comprises the steps of: electronically receiving from a user computer terminal an indication of a desire to search a computer network; electronically transmitting to that user computer terminal, in response to that indication, data comprising terms from one or more databases; and electronically receiving from the user terminal data comprising a search query, wherein said query comprises one or more of said terms.

In various aspects, the computer network comprises the Internet; one or more databases comprise a products and services database; one or more databases comprise an economic activities database; one or more databases comprise a technical terms database; one or more databases comprise a commerce terms database; and one or more databases comprise a geographical terms database.

The search query preferably comprises English language terms. Those English language terms may be selected via a multi-language user interface operable to interact with a user in the user's native language. In one embodiment, the method further comprises recording in an electronic database data comprising queries received from the user terminal. The method also may comprise recording in an electronic database data comprising search results of said query. It also may comprise recording in an electronic database data comprising URLs of websites in search results that a user has linked or attempted to link to, and may comprise recording in an electronic database data obtained from those websites.

In a further aspect, the invention comprises a method for searching a computer network, comprising the steps of electronically transmitting to a server computer an indication of a desire to search a computer network; electronically receiving from that server computer, in response to that indication, data comprising terms from one or more databases; and electronically transmitting to the server computer data comprising a search query, wherein said query comprises one or more of those terms. The method also may comprise comprising providing a multi-language user interface operable to enable a non-English speaking user to formulate said query in English. The multi-language user interface preferably is operable to enable a non-English speaking user to formulate a query in a non-English language of the user's preference.

One goal of the invention is to provide an automated friendly interface with optimum search query possibilities. The user is not required to enter English keywords into a search engine entry box. A user may click in his native language to create friendly ready-made sentences operable to provide a precise search query for searching data regarding product, service or industry group of interest.

In one embodiment, the system comprises three databases. Database 1 (ISO/ICS data) comprises data based on the official production oriented subject structure of the International Classification for Standards (ISO-ICS), which provides standard terminology regarding products and services classified by subject. This structure is translated into the language of each country to facilitate finding the desired query and information.

Database 2 (NAICS US Structure) stores the official full titles for each industry or sector and shows all the subsectors, industry groups, industries, and industry details for each of the NAICS sectors This structure is translated into the language of each country to facilitate finding the desired query and information.

Database 3 stores business, technical, and geographical terminology is translated into the language of each country to facilitate finding the desired query and information.

BRIEF DESCRIPTION OF THE DRAWINGS

The present invention will be readily understood by the following detailed description of preferred embodiments of the invention with reference to the drawings, in which.

DETAILED DESCRIPTION OF PREFERRED EMBODIMENTS

In a preferred embodiment, the present invention provides two databases with ready-made query sentences from ISO Technical Standards terminology and from the North American Industry Classification System (NAICS). Preferably, the system also has an optional language for constructing an initial query sentence (preferably based on subject structure) for each country (or other geographical region), to facilitate searching performed by non-English speakers.

Figure 1:
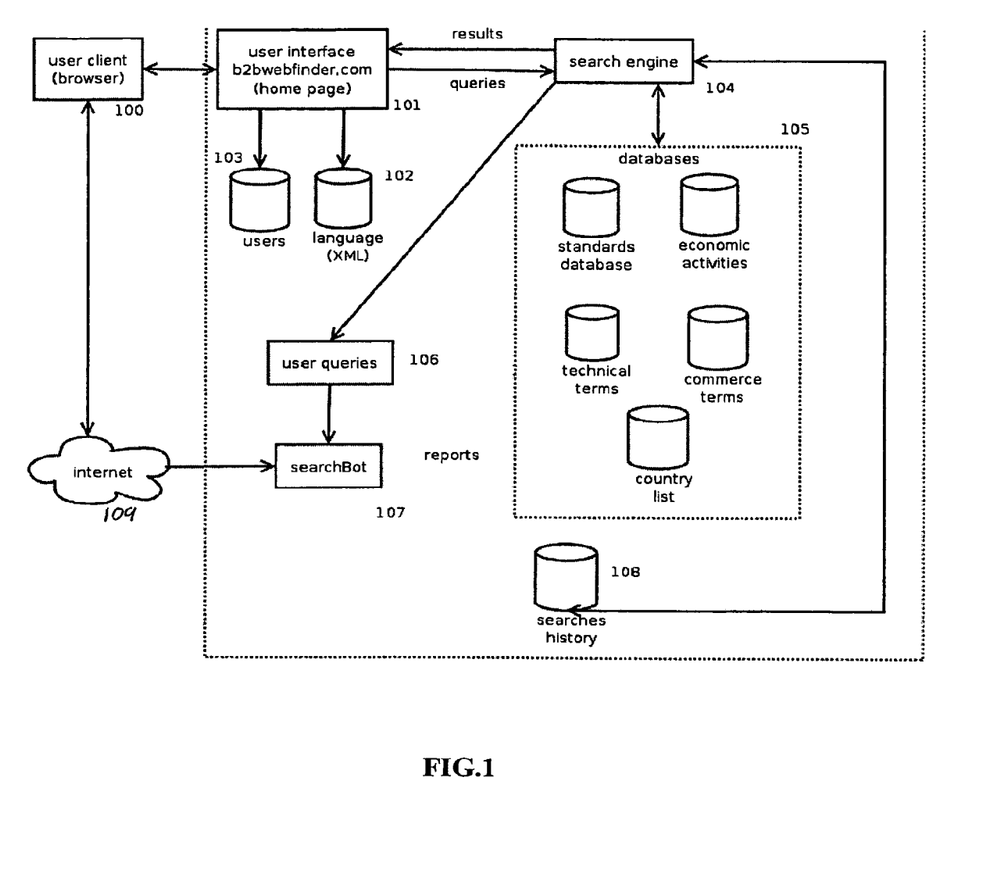
FIG. 1 is a process flow diagram showing a preferred system and method embodiment for building ready-made queries for retrieving relevant information on the World Wide Web.

The drawings, and more particularly FIG. 1, show a general arrangement of a preferred embodiment of the present invention. The main components of interest are the databases comprising standards and economic activities data and the module to get a query (106) to provide to a searchbot (107).

The Internet (109) comprises the World Wide Web ("the Web"), which works on client-server architecture. The Web is the graphical, multimedia portion of the Internet where the client side program is a Web browser (100) and the server side is a computer running the HTTP program (101). A Web server is accessed through the Internet by specifying a Uniform Resource Locator (URL) (preferably www.b2bwebfinder.com in this case). A user may can select interface language communication (102) and supply a username/password for authorization to enter the system (103).

The user then preferably chooses from a "subject list" appropriate terminology in his native language, which is sent to search engine (104), which gathers results from various databases (105). The non-English query is then translated into the English language (106). Once the English-language query is ready it goes to a searchbot (107). The searchbot is an indexer robot which returns with hyperlinks (in html) of the sites found on the Internet for the English-language query. The user's selected results (URLs) are presented in the user's browser and saved into a search history database (108), to be compiled into a user report.

Figure 2:
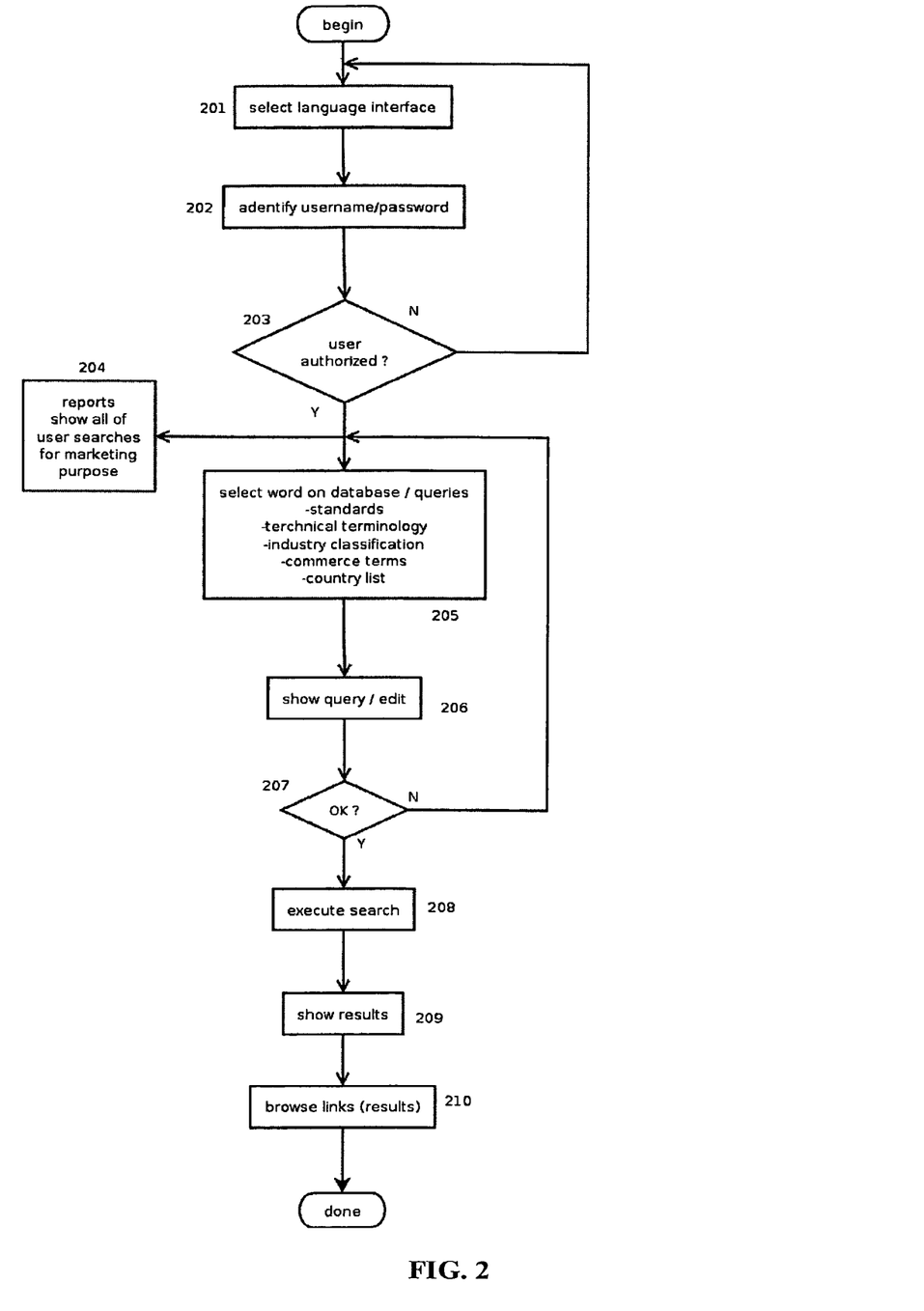
FIG. 2 is a flowchart showing steps of a preferred method embodiment for acquiring and presenting data queries for business intelligence purposes.

FIG. 2 is a flowchart showing preferred steps of a method embodiment of this invention. The first step is to select language interface (201). This process works with the user's native language to help identify the appropriate subject structure (non English) and hierarchical classification. The user logs into the system (202) and the system checks whether the user is authorized (203). If he logs on, the system enables the user to formulate the queries in English or examine his user report (204). In the user report module, the user can see hyperlinks of all web sites visited as well as personal data information for business and marketing purposes. The next step is to select subjects and terms on various databases (205). After selecting one or more technical and other terms, the user can edit and refine the query. Once the query is approved (207), the next step is to run the search through the searchbot (208) and retrieve the relevant hyperlinks of the subject requested by the query (209). The user can browse the Internet by choosing one of the hyperlinks accepted (210).

Figure 3:
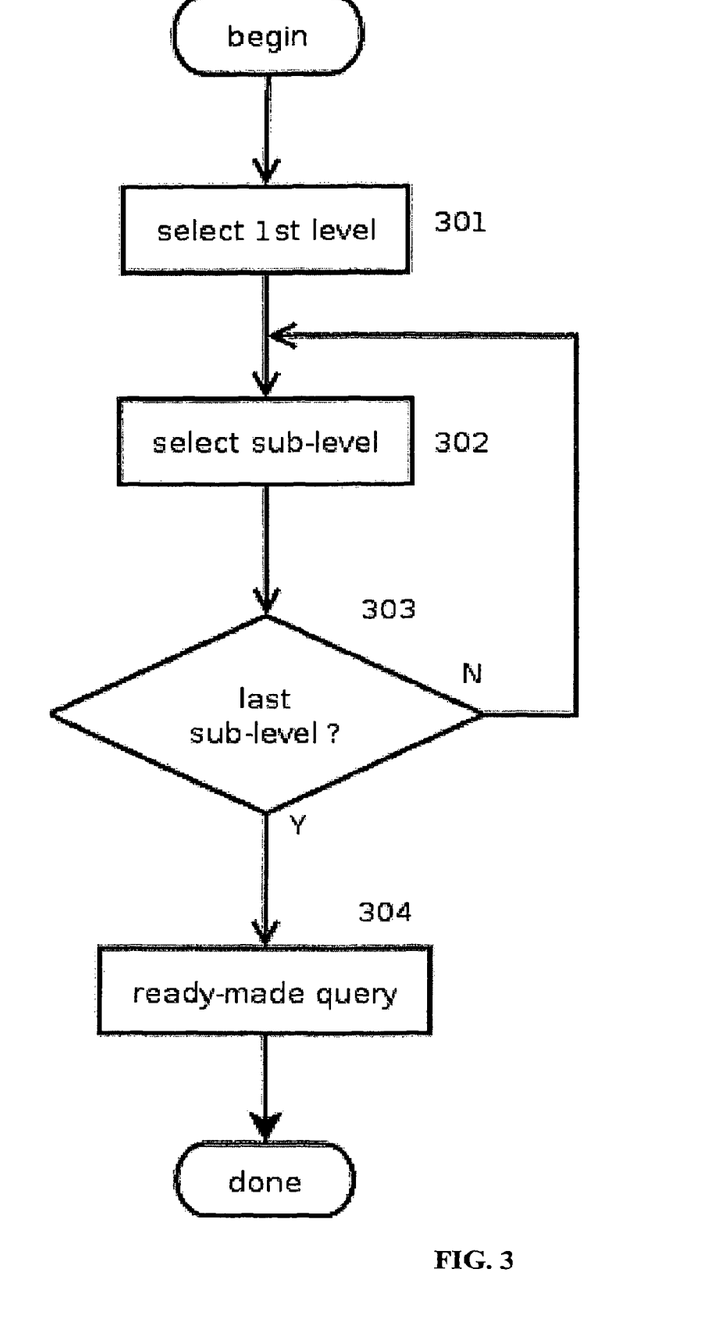
FIG. 3 is a flowchart of a preferred data acquisition routine that accesses a Products and Services or Economic activities database.

FIG. 3 shows a preferred process (205) for retrieving strategic words from a standards technical specification terminology database or an economic activities specifications database (which preferably uses the activities standardization from the NAICS (North American Industry Classification System) structure). In the standards terminology database, there are various levels (301) like—Civil engineering—and sub-levels to choose (302) like—Construction of airports engineering—. Once the last sub level is accepted, the ready-made strategic sentence is constructed for the query (304)—for example, Aeronautical ground lighting electrical installation. The same process may be used to collect the NAICS structure for economic activities specifications. Note that NAPCS could be used to search for products.

Figure 4:
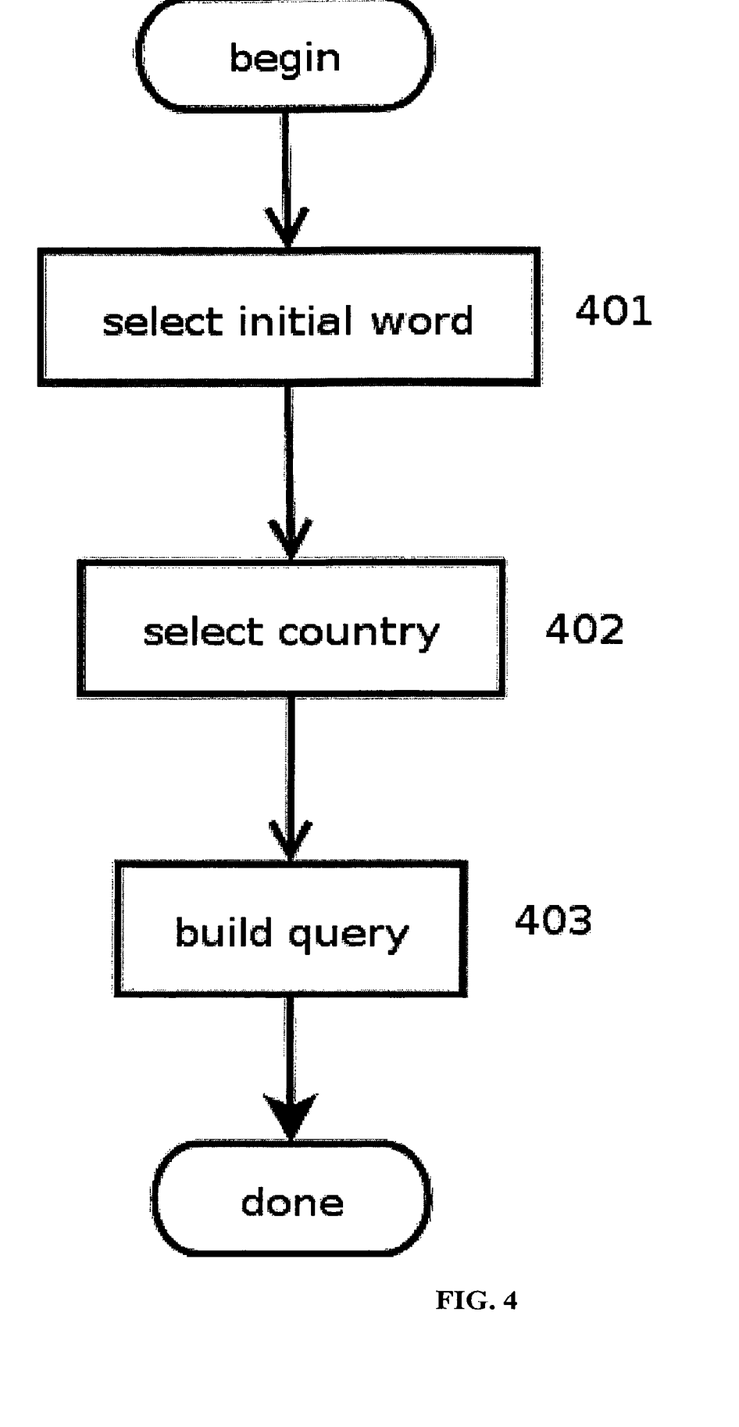
FIG. 4 is a flowchart of a preferred data acquisition routine that accesses a list of worldwide countries to build a query.

FIG. 4 shows a preferred process (205) for retrieving strategic words from a list of countries to build the query. Select the initial letter of the country looked for: A, B, C, etc. (401), select a country name desired (402), accept this country to add to the query being constructed (403).

Figure 5:
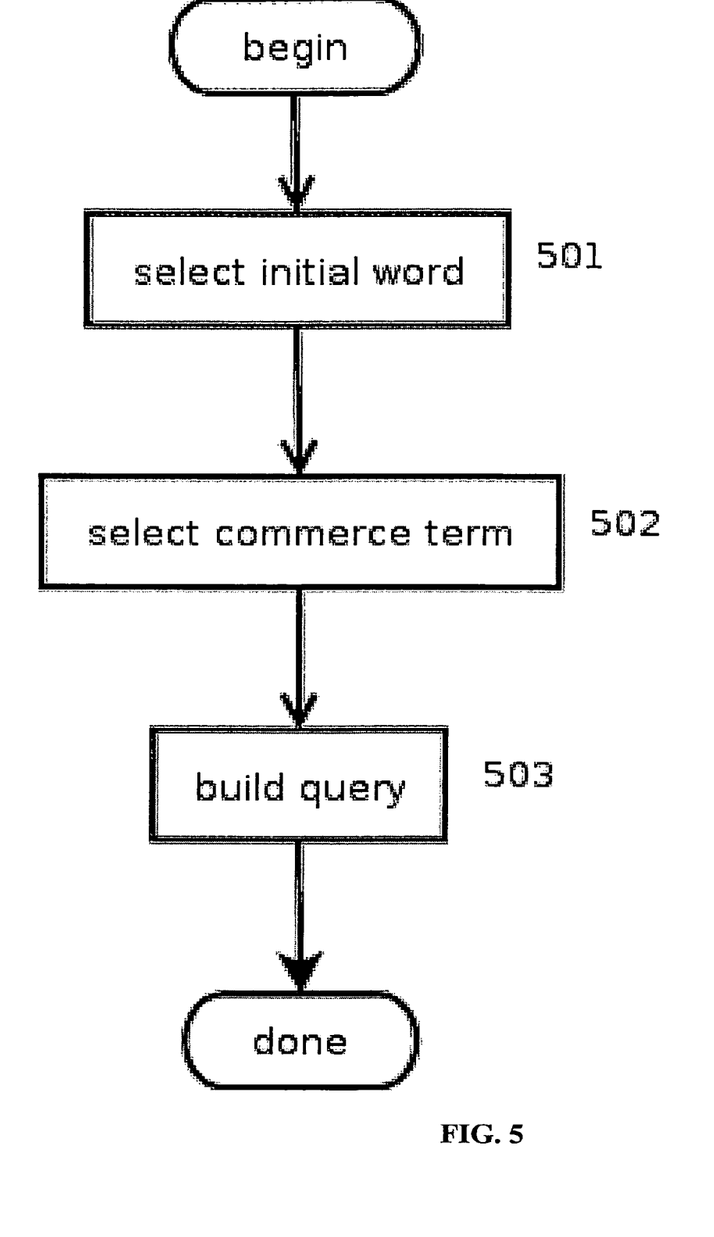
FIG. 5 is a flowchart of a preferred data acquisition routine that accesses a list of international commerce terms to build a query.

FIG. 5 shows a preferred process (205) for retrieving strategic words from a list of commonly used international commerce terms to build the query. Select the initial letter of the commerce terms looked for: A, B, C, etc. (501), select a commerce term desired (502), accept this term to add to the query being constructed (503).

Figure 6:
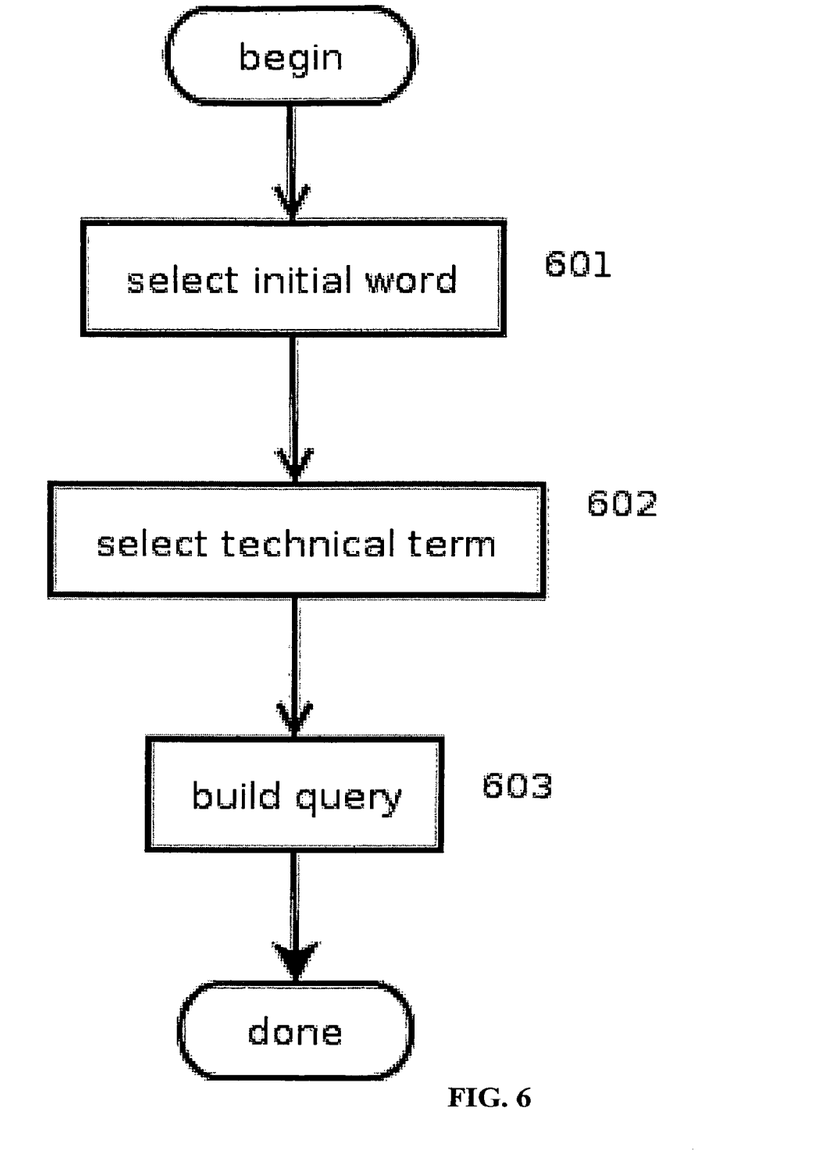
FIG. 6 is a flowchart of a preferred data acquisition routine that accesses a list of commonly used technical terms to build a query.

FIG. 6 shows a preferred process (205) for retrieving strategic words from a list of commonly used technical terms to build a query. Select the initial letter of the technical terms looked for: A, B, C, etc. (601), select a technical term desired (602), accept this term to add to the query being constructed (603).

Figure 7:
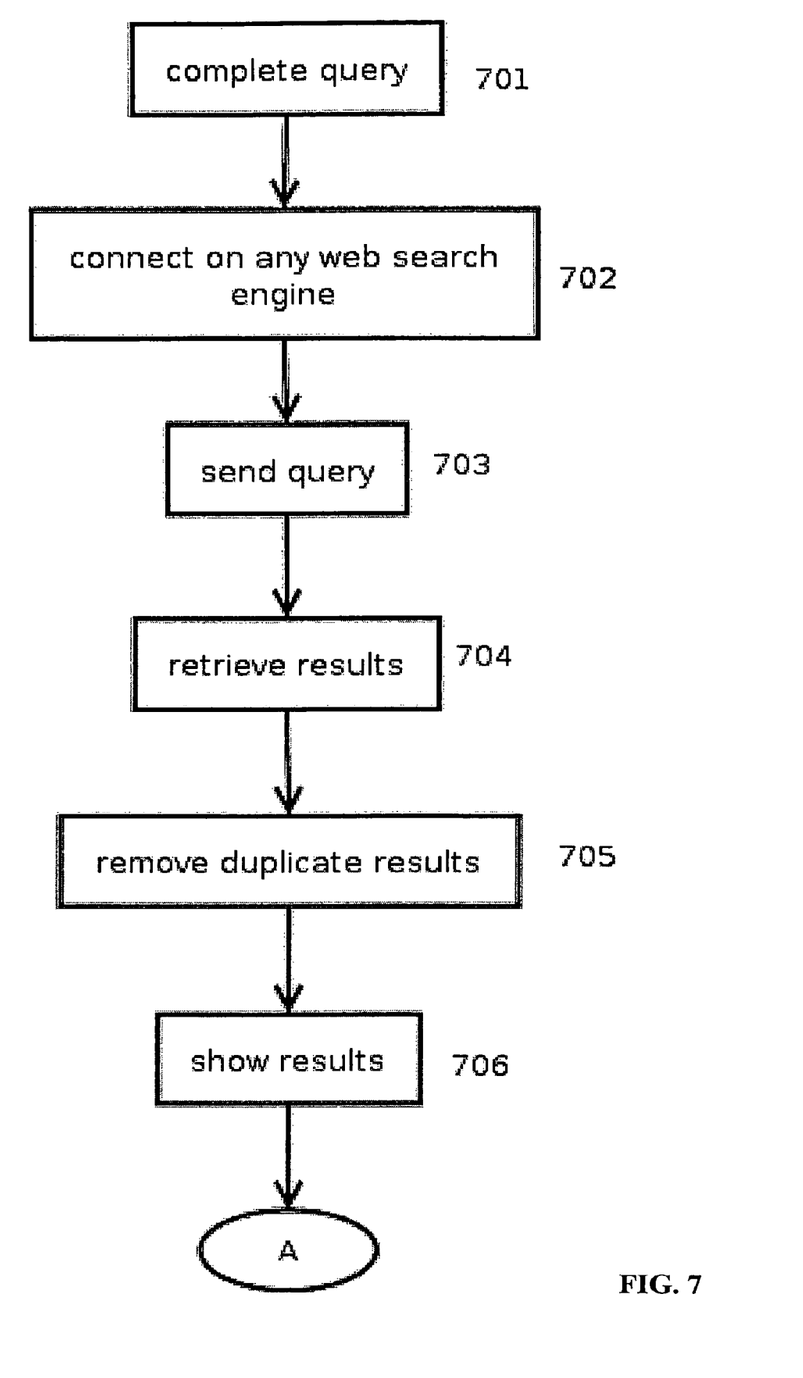
FIG. 7 is a flowchart of a preferred method for retrieving links (URLs) found by a query.

FIG. 7 shows a preferred process (208) and (209) for implementing a complete query (701). The query is submitted to a Web search engine (702) and (703), the results are retrieved (704), the duplicate hyperlinks are removed (705), and the 50 best results found are displayed (706).

Figure 8:
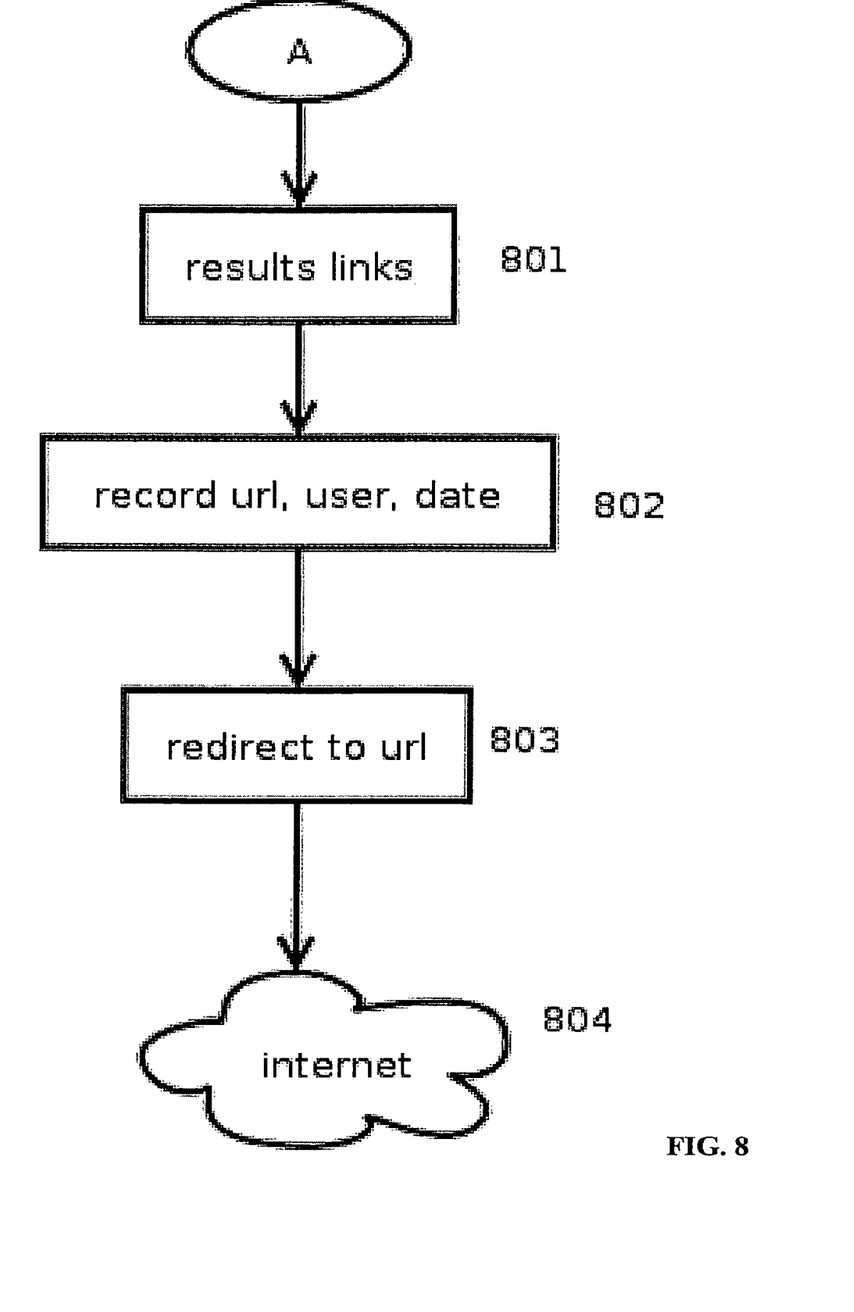
FIG. 8 is a flowchart showing preferred steps for recording user results and usage.

FIG. 8 shows a preferred process (210) for obtaining strategic information of products and services through the Web. The hyperlinks (801) selected by a user are recorded: URL, user, and date, for example, are stored in a user report (802), then the system redirects the user's browser to the URL selected (803). The site found is likely to contain much relevant and strategic information (804).

Illustrative Example A: A Brazilian businessman who manufactures lighting and signaling for auto makers is looking for competitive intelligence information in Japan for his products, but he is not fluent in English and doesn't know how to develop a search strategy.

1. The user selects his native language (in this case, Portuguese).

2. The user logs into the system and identifies himself.

3. The user accesses subject structure (in Portuguese); preferred structures comprise those of NAICS and ICS (others, such as NAPCS, could also be used). He chooses ICS, a hierarchical classification whose hierarchies may have as many as 4 levels. Level 1 covers broad fields of activities in standardization. The fields are divided into groups and subgroups. For example:

Portuguese level 1=Road Vehicle Engineering
Portuguese level 2=Commercial vehicles
Portuguese level 3=Vehicle systems
Portuguese level 4=Lighting, signaling and warning devices 4. By selecting various levels and sublevels, the user constructs a ready-made query in Portuguese. That query is then translated into English to create an English-language query (for example: Road Vehicles—retro reflective registration plates for motor vehicle and trailers).

5. Once created, the ready-made English-language query is displayed to the user.

6. The English-language query may then be edited. The user also may choose from a country list (in Portuguese) the country of interest (in this case it is Japan) to complete the query. The user may remove undesirable words and may add selected terms from lists of commerce terms or technical terms, for example.

8. Once the query is ready, a search is executed by the searchbot.

9. The results presented are relevant links on the web matched with the terminology of the query.

Illustrative Example B: Brazilian importer wishes to import telephone devices from USA.

1. The user selects his native language (in this case: Portuguese).

2. The user logs into the system and identifies himself.

3. The user accesses subject structure in his native language (Portuguese). He chooses NAICS, a hierarchical classification whose hierarchies may have as many as 4 levels. Level 1 covers broad fields of economic activities. The fields are divided in to groups and subgroups. For example:

Portuguese level 1=Manufacturing
Portuguese level 2=Computer and Electronic product manufacturer
Portuguese level 3=Communication equipment manufacturer.
Portuguese level 4=Telephone apparatus manufacturing.

4. By selecting various levels and sublevels, the user constructs a ready-made query in Portuguese. That query is then translated into English to create an English-language query.

5. Once created, the ready-made English-language query is displayed to the user.

6. The English-language query may be edited. The user also may choose from a country list (in Portuguese) the country of interest (in this case it is the USA) to complete the query. The user may remove undesirable words and may add selected terms from lists of commerce terms or technical terms, for example.

8. Once the query is ready, a search is executed by the searchbot.

9. The results presented are relevant links on the web matched with the terminology of the query.

The embodiments described herein are to be considered as illustrative and not restrictive, and the invention is not to be limited to the details given herein, but may be modified within the scope and equivalents of the appended claims. For example, those skilled in the art will recognize that although use of hierarchical taxonomies has been described, other taxonomies (such as faceted, multidimensional, or relational taxonomies) also are included within the scope of the present invention.

What is claimed is:

1. A system for enabling a user to locate information of interest in different human languages, comprising:
   one or more databases containing terms in a first human language, wherein the terms are organized into a hierarchical structure;
   a first computer executing search interface software recorded on a computer-readable medium and associated with a collection of information in a second human language, wherein the search interface software when executed causes the first computer to receive search queries in the second human language and to communicate search results from the collection of information in the second human language; and
   a second computer executing user interface software recorded on a computer-readable medium, wherein the user interface software when executed causes the second computer to communicate with the one or more databases, the search interface software, and a user, and to:
      access the terms in the first human language from the one or more databases;
      communicate with the user to allow the user to navigate through the terms in accordance with the hierarchical structure;
      receive an indication that the user has selected one or more of the terms in the first human language;
      generate a draft search query in the second human language based on a translation of the selected one or more terms;
      display the draft search query in the second human language to the user;
      receive a revised search query in the second human language from the user;
      communicate the revised search query in the second human language to the first computer executing the search interface software;
      receive from the first computer search results in the second human language; and
      communicate the search results in the second human language to the user,
   wherein the one or more databases, the first computer, and the second computer are in communication with a computer network.

2. The system of claim 1, wherein the one or more databases comprise a products and services database.

3. The system of claim 2, wherein the products and services database comprises an ISO technical standards specification on industrial taxonomy.

4. The system of claim 3, wherein the ISO technical standards specification comprises ICS (International Code Standard) terminology.

5. The system of claim 4, wherein the ICS data comprises information relevant to a search for products or services.

6. The system of claim 1, wherein the one or more databases comprise an economic activities database.

7. The system of claim 6, wherein the economic activities database comprises NAICS data.

8. The system of claim 7, wherein the NAICS data comprises information relevant to a search for economic activities.

9. The system of claim 6, wherein the economic activities database comprises NAPCS data.

10. The system of claim 1, wherein the one or more databases comprise a geographical terms database.

11. The system of claim 10, wherein the geographical terms database comprises a country list database.

12. The system of claim 1, wherein the one or more databases comprise a technical terms database.

13. The system of claim 1, wherein the one or more databases comprise a commerce terms database.

14. The system of claim 1, wherein the computer network is the Internet.

15. The system of claim 1, wherein:
   the one or more databases include ready-made sentences in the first human language, and each of the terms is associated with at least one of the ready-made sentences; and
   the second computer executing the user interface software generates the draft search query in the second human language by:
      accessing a ready-made sentence in the first human language associated with the selected one or more term, and
      translating the accessed ready-made sentence in the first human language into the second human language to form the draft search query in the second human language.

16. The system of claim 1, the second computer further executing user reporting software recorded on a computer-readable medium, wherein the user reporting software when executed causes the second computer to communicate with the user interface software and to record one or more of: the revised search query, the search results, and an identity of the user.

17. The system of claim 1, wherein the user interface software when executed causes the second computer to generate the draft search query in the second human language by:
   generating the draft search query in the first human language based on the selected one or more terms; and
   translating the draft search query in the first human language into the second human language to form the draft search query in the second human language.

18. The system of claim 1, wherein the one or more databases include lists of business, technical, or geographic terms in the first human language, and the second computer executing the user interface software allows the user to edit the draft search query in the second human language by:
   allowing the user to browse the lists of business, technical, or geographic terms in the first human language, and to select at least one term from the lists in the first human language, translating the selected at least one term from the lists into the second human language to form at least one translated term, and adding the at least one translated term into the draft search query in the second human language.

19. The system of claim 1, wherein the user interface software is located on a server.

20. The system of claim 1, wherein the user interface software is located on a user computer.

21. The system of claim 1, wherein:

the one or more databases include ready-made sentences in the second human language, and each of the terms in the first human language is associated with at least one of the ready-made sentences in the second human language; and the second computer executing the user interface software generates the draft search query in the second human language by accessing a ready-made sentence in the second human language associated with the selected one or more terms.

22. A computer implemented method for enabling a user to locate information of interest in different human languages, comprising:

accessing, by a computer, one or more databases containing terms in a first human language, wherein the terms are organized in a hierarchical structure;

communicating, by the computer, with a user to allow the user to navigate through the terms in accordance with the hierarchical structure;

electronically receiving, at the computer, an indication that the user has selected one or more of the terms in the first human language;

generating, by the computer, a draft search query in a second human language based on a translation of the selected one or more terms;

displaying, by the computer, the draft search query in the second human language to the user;

receiving, at the computer, a revised search query in the second human language from the user;

communicating, by the computer, the revised search query in the second human language to a search interface software associated with a collection of information in the second human language, wherein the search interface software operates to receive revised search queries in the second human language and to communicate search results from the collection of information in the second human language;

receiving, at the computer, from the search interface software search results in the second human language; and communicating, by the computer, the search results in the second human language to the user.

23. The method of claim 22 further comprising:

recording the search results in an electronic database.

24. The method of claim 23 further comprising:

recording in an electronic database data comprising URLs of websites in the search results that the user has linked or attempted to link to.

25. The method of claim 24 further comprising:

recording in an electronic database data obtained from the websites.

26. The method of claim 22, wherein the collection of information is part of the Internet.

27. The method of claim 22, wherein the one or more databases comprise a products and services database.

28. The method of claim 22, wherein the one or more databases comprise an economic activities database.

29. The method of claim 22, wherein the one or more databases comprise a technical terms database.

30. The method of claim 22, wherein the one or more databases comprise a commerce terms database.

31. The method of claim 22, wherein the one or more databases comprise a geographical terms database.

32. The method of claim 22, wherein the second human language is English.

33. The method of claim 22 further comprising:

recording in an electronic database the selected one or more terms received from the user terminal.

34. The method of claim 22, wherein the one or more databases include ready-made sentences in the second human language, and each of the terms in the first human language is associated with at least one of the ready-made sentences in the second human language; and the generating the draft search query in the second human language based on the selected term comprises accessing a ready-made sentence in the second human language associated with the selected one or more terms.

* * * * *